J. HOWARTH.
CARBON BLACK MANUFACTURED FROM NATURAL CARBURETED HYDROGEN GAS.
No. 6,937. Reissued Feb. 22, 1876.
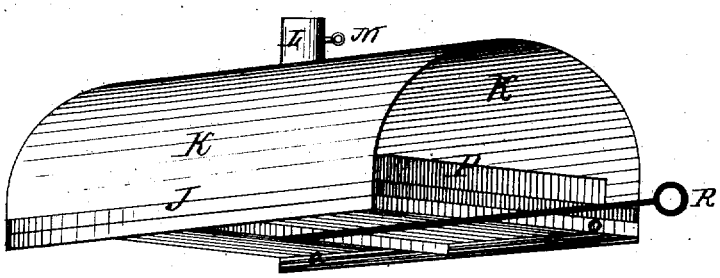
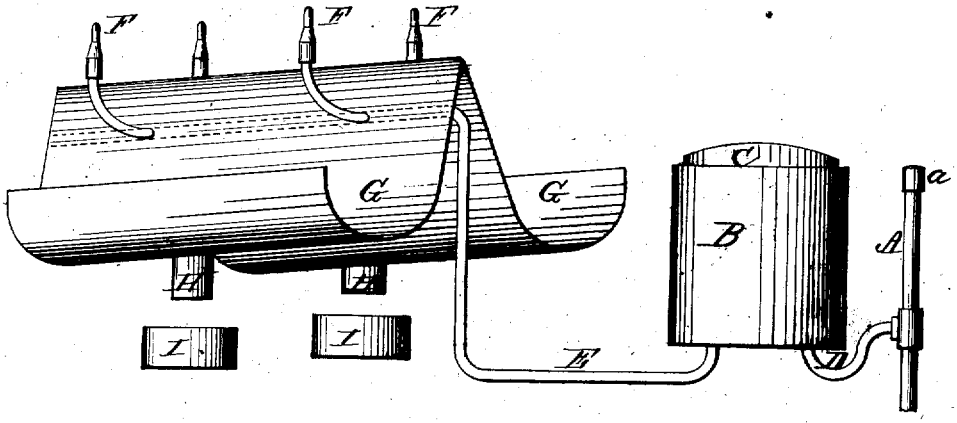
Witnesses:
John Tyler
Arthur L. McIntire
Inventor:
John Howarth
By atty
Wm. C. W. McIntire

UNITED STATES PATENT OFFICE.

JOHN HOWARTH, OF NEW CUMBERLAND, WEST VIRGINIA, ASSIGNOR, BY MESNE ASSIGNMENTS, TO THE CARBON-BLACK COMPANY, OF NEW YORK CITY.

IMPROVEMENT IN CARBON-BLACK MANUFACTURED FROM NATURAL CARBURETED-HYDROGEN GAS

Specification forming part of Letters Patent No. 131,446, dated September 17, 1872; reissue No 6,937, dated February 22, 1876; application filed April 20, 1875.

*To all whom it may concern:*

Be it known that I, JOHN HOWARTH, of New Cumberland, in the county of Hancock and State of West Virginia, have made an invention of a new and useful Carbon-Black; and I do hereby declare the following to be a full, clear, and exact description thereof, due reference being had to the accompanying drawing, which is a perspective view of the apparatus used for carrying out my invention.

The purpose of my invention is to utilize the carbureted-hydrogen gas which escapes in considerable quantities from the tubular wells sunk in the earth in the attempt to obtain petroleum or hydrocarbon oil, this gas having heretofore been allowed to go to waste, the result of this utilization being a superior carbon-black, readily distinguishable from any other carbon-black now known.

To enable others to carry out my invention and produce this improved product, I will proceed to describe the process by which it is obtained, referring by letters to the accompanying drawing, which is a perspective view of an apparatus which I have found to be very practical.

A represents the upper portion of the tube of a tubular well, such as is sunk in many localities in prospecting for petroleum-oil, such tube being provided with a safety-valve, *a*, which permits of the escape of gas when the pressure exerted by it upon the receiver is too great. B represents a vessel composed of a suitable material, and containing a quantity of water or oil, upon which a bell-float, C, is placed, after the manner of ordinary gas-reservoirs, the well-tube A communicating with the interior of the vessel B by a suitable pipe, D. Extending from the receiver B to a suitable locality is a second pipe, E, which terminates in a horizontal extension, upon which are placed a series of gas-burners, F F, &c., in such number as may be found desirable. Below each burner or set of burners I dispose a curved apron or trough, G, from the bottom of which, one or more discharge pipes or ports, H H, extend, the outlet of each pipe being situated immediately over a movable box or receptacle, I, placed below them. In order to intercept the flame issuing from each burner, and collect the carbon resulting from the partial combustion thereof, I employ a slab or tile, J, of soapstone or other material, which I dispose horizontally over the series of burners, this slab being pierced with a number of orifices to permit the passage of an excess of smoke, the tile being covered with a suitable dome or roof, K, disposed as shown in the drawing, this dome or roof being provided with a ventilating-pipe, L, in which is placed a damper, M. Below the slab or tile J I dispose one or more transverse horizontal scrapers, O O, &c., these scrapers being supported and sliding in horizontal grooves or ways *a a* formed in the lower part and on opposite sides of the dome P.

In practice I prefer that a scraper should be provided for each pair of burners, in order that a short movement of the handle or rod which connects them may suffice to scrape the entire under surface of the slab J.

The operation of the apparatus is as follows: The gas, issuing from the tube A under considerable pressure, passes through the pipe D and into the reservoir B, from whence it passes into the pipe E and burners F F, &c. The gate of each burner is opened and the gas lighted, each flame being intercepted by the soap-stone slab J, which is located immediately over them. The carbon resulting from the imperfect combustion of the gas is deposited upon the under side of the slab J, from which it is to be detached by scrapers O O, &c., and precipitated into the troughs G G, from whence it is delivered through the ports H H to the vessels I I, which are to be emptied into a suitable receiver as often as necessary. As a high temperature of the slab J would impair the color of the carbon-black deposited upon it, I arrange upon its upper surface a closed pan or vessel, P, of water, to reduce its temperature, such water being constantly renewed. Any particles of carbon-black which may escape upwardly through the perforations of the slab J will enter the chamber or dome K, and be deposited upon the cover of the pan P or other parts of the chamber.

The safety-valve *a* provides a means of disposing of such portion of the gas issuing from the well-tube as is not required at the burners.

I do not, of course, wish to confine myself arbitrarily to the precise details of the apparatus or process, as they may be varied without departing from my invention, an important part of which consists in the discovery and production, by suitable means, of a carbon-black from the imperfect combustion of natural carbureted-hydrogen gas.

My carbon-black is more intense in its blackness than any other known similar product, owing to the fact that it is more translucent, which translucency is due to its homogeneous character, it being formed by the partial combustion of a single and very simple hydrocarbon compound, whereas other carbon blacks before known were produced by the partial combustion of such substances as oils, fat, tar, resin, pitch, dead-oil, and the like, which are mixtures of numerous very complex compounds, and which yielded, as was very well known, products by no means homogeneous nor translucent in the sense in which my carbon-black is homogeneous and transparent.

It is well known to chemists and those skilled in the arts that the most perfect way of producing blackness (which is simply the absence of light) is the employment of means by which light falling on a certain area is not reflected or thrown back again. Thus an opening into empty space or into non-illuminated space, like a mine or cellar, where there are no objects in range with the opening by which the light there entering would be reflected back again, would be absolutely black. Next to this, in perfection of blackness, are certain transparent substances, like black glass, which, allowing the light to enter them, destroy or absorb it by some specific action among their molecules. Such bodies owe their efficient blackness largely to their homogeneous structure; for, if they cease to be homogeneous, as does black glass, for example, when powdered, becoming then a mixture of glass and air, then, the light being variously reflected and scattered at the numerous surfaces of contact of the two materials, (glass and air,) is in part thrown out, and does not entirely enter the substance of the glass, to be there absorbed or destroyed. Homogeneous black glass is thus much blacker than the same glass when its homogeneity has been destroyed by pulverizing or by any other means, such as irregular crystallization in cooling, or the like. Next to the transparent black bodies we have those which—like carbon in certain forms, as plumbago or black lead, coal, charcoal, ordinary lamp-black, and many minerals, such as the black oxide of manganese, the black oxide of copper, &c.—simply refuse to reflect from their surfaces most of the light which falls upon them. These are, however, always imperfect in their power of destroying all the light which they receive, and thus are inferior in blackness to the translucent blacks, such as glass, jet, ink in its fluid state, and the like. It thus appears that of two black bodies otherwise alike, that which is transparent will be the most intense; and, moreover, to be translucent it must be homogeneous in structure, or consist of a single substance, simple or compound, and not of a mixture of two or more dissimilar materials. From these considerations, it appears that, if an hydrocarbon of simple composition be so burned as to produce soot or lamp-black, this body will be of a simple and homogeneous character as compared with soot or lamp-black obtained by burning in a similar manner highly complex and mixed hydrocarbons, and it is this difference between the carbon-black produced by me from natural carbureted-hydrogen gas that renders it superior to, and readily distinguishable from, any of the known carbon-blacks heretofore produced.

What I claim as new, and desire to secure by Letters Patent, is—

1. Carbon-black, possessing the peculiarities of intense blackness and homogeneity, as specified, and forming a new article of manufacture.

2. I also claim the apparatus herein shown and described, consisting of the tube A, provided with a safety-valve *a* and connecting-pipe D, the reservoir and float B C, pipe E, provided with a series of burners, F, curved apron or trough G, tile J, dome K, and scrapers O, as and for the purpose set forth.

Witness my hand and seal this 16th day of February, A. D. 1875.

JOHN HOWARTH. [L. S.]

Witnesses:
M. M. ROHRER,
L. R. BART.